US010948149B2

(12) United States Patent
Karthaus

(10) Patent No.: US 10,948,149 B2
(45) Date of Patent: Mar. 16, 2021

(54) LIGHTING DEVICE FOR VEHICLES

(71) Applicant: Hella GmbH & Co. KGaA, Lippstadt (DE)

(72) Inventor: Daniela Karthaus, Lippstadt (DE)

(73) Assignee: Hella GmbH & Co. KGaA, Lippstadt (DE)

(*) Notice: Subject to any disclaimer, the term of this patent is extended or adjusted under 35 U.S.C. 154(b) by 62 days.

(21) Appl. No.: 16/094,897

(22) PCT Filed: Apr. 10, 2017

(86) PCT No.: PCT/EP2017/058527
§ 371 (c)(1),
(2) Date: Oct. 19, 2018

(87) PCT Pub. No.: WO2017/182311
PCT Pub. Date: Oct. 26, 2017

(65) Prior Publication Data
US 2019/0129360 A1 May 2, 2019

(30) Foreign Application Priority Data
Apr. 20, 2016 (DE) .................... 10 2016 107 307.5

(51) Int. Cl.
*F21S 41/143* (2018.01)
*F21S 41/20* (2018.01)
(Continued)

(52) U.S. Cl.
CPC ........... *F21S 41/143* (2018.01); *F21S 41/147* (2018.01); *F21S 41/151* (2018.01); *F21S 41/153* (2018.01);
(Continued)

(58) Field of Classification Search
CPC ......... F21S 41/14; F21S 41/663; G03H 1/265
See application file for complete search history.

(56) References Cited

U.S. PATENT DOCUMENTS 5,455,747 A * 10/1995 Aoyama ............... B60Q 1/2607
362/545
10,539,288 B2 * 1/2020 Muegge ............... B60Q 1/0041
(Continued)

FOREIGN PATENT DOCUMENTS

DE 102006043402 A1 3/2008
DE 102015102243 A1 9/2016
(Continued)

OTHER PUBLICATIONS

Machine Translation of WO 2012/033174 (Year: 2012).*
Karthaus, D. et al., "Holograms in automotive Headlamps with LED Illumination," ISAL 2015 Proceedings, 2015, pp. 521-530.

*Primary Examiner* — Leah Simone Macchiarolo
(74) *Attorney, Agent, or Firm* — Husch Blackwell LLP

(57) ABSTRACT

A lighting device for vehicles, and in particular headlamps, having a light source unit, and having a holographic unit for the generation of a given light distribution. The holographic unit has a hologram on the basis of a photo-sensitive material, onto which the holographic information is applied by means of an exposure process. The hologram is formed by a multitude of hologram segments. The hologram segments are each assigned a separate light source of the light source unit. The hologram segments serve to generate the given light distribution. Herein, holographic information is applied to the hologram segments depending on different wavelengths and different angles of the light source assigned to the hologram segments.

9 Claims, 6 Drawing Sheets

(51) Int. Cl.
*F21S 41/147* (2018.01)
*F21S 41/663* (2018.01)
*F21S 41/16* (2018.01)
*F21S 41/151* (2018.01)
*F21S 41/153* (2018.01)
*G03H 1/02* (2006.01)
*G03H 1/26* (2006.01)
*G03H 1/22* (2006.01)

(52) U.S. Cl.
CPC .............. *F21S 41/16* (2018.01); *F21S 41/285* (2018.01); *F21S 41/663* (2018.01); *G03H 1/0248* (2013.01); *G03H 1/265* (2013.01); *G03H 1/2202* (2013.01); *G03H 2222/13* (2013.01); *G03H 2222/17* (2013.01); *G03H 2222/34* (2013.01)

(56) References Cited

U.S. PATENT DOCUMENTS

| | | | |
|---|---|---|---|
| 2004/0027626 A1* | 2/2004 | Yamauchi | G03H 1/0841 359/3 |
| 2008/0068852 A1 | 3/2008 | Goihl | |
| 2009/0168631 A1* | 7/2009 | Minabe | G11B 7/0065 369/112.23 |
| 2012/0212933 A1* | 8/2012 | Toko | F21S 41/40 362/84 |
| 2013/0169941 A1* | 7/2013 | Kurashige | G02B 27/48 353/38 |
| 2013/0170006 A1* | 7/2013 | Kurashige | G02B 5/0252 359/15 |
| 2015/0009695 A1* | 1/2015 | Christmas | F21S 41/285 362/466 |
| 2017/0334339 A1* | 11/2017 | Kurashige | F21S 41/00 |
| 2019/0072776 A1* | 3/2019 | Nishio | F21S 41/285 |

FOREIGN PATENT DOCUMENTS

| | | | | |
|---|---|---|---|---|
| EP | 2642187 A1 | 9/2013 | | |
| EP | 2975318 A1 | 1/2016 | | |
| JP | 2016109530 A | 6/2016 | | |
| KR | 1020150134979 A | 12/2015 | | |
| KR | 1020150134980 A | 12/2015 | | |
| WO | WO-2012033174 A1 * | 3/2012 | ............ | G03B 33/06 |
| WO | 2012047483 A2 | 4/2012 | | |
| WO | 2016072484 A1 | 5/2016 | | |
| WO | 2016088510 A1 | 6/2016 | | |

* cited by examiner

LIGHTING DEVICE FOR VEHICLES

CROSS REFERENCE

This application claims priority to PCT Application No. PCT/EP2017/058527, filed Apr. 10, 2017, which itself claims priority to German Patent Application 10 2016 107307.5, filed Apr. 20, 2016, the entirety of both of which are hereby incorporated by reference.

FIELD OF THE INVENTION

The invention relates to a lighting device for vehicles, in particular headlamps, having a light source unit and a holographic unit for the generation of a given light distribution, wherein the holographic unit has a hologram on the basis of a photo-sensitive material to which holographic information is applied by means of a exposure process.

BACKGROUND

From the US 2015/0009695 A1, a lighting device for vehicles is known, which has a light source unit and a holographic unit for the generation of a given light distribution.

As a hologram, the holographic unit has a transmitting light modulator, via which holographic information is rendered. The holographic information is exclusively phase information provided by means of a computer. As the light modulator and the control of the light modulator form part of the lighting device, different light distributions can be generated dynamically during driving. Due to this, the space and control requirements are relatively extensive, however.

SUMMARY OF THE INVENTION

It is the task of the present invention, to develop a lighting device for vehicles having a holographic unit further so that with little effort a multitude of light distributions can be provided.

To solve this task, the invention in connection with the preamble of patent claim 1 is characterized in that the hologram is formed by a multitude of hologram segments, wherein each of the hologram segments is assigned a separate light source of the light source unit, and wherein the hologram segments serve the generation of the given light distribution, and that holographic information has been applied to the hologram segments depending on different wavelengths and different angles of the light sources assigned to the respective hologram segments According to the invention, a hologram with a multitude of hologram segments is provided, each of which is assigned a separate light source of a light source unit, and wherein the hologram segments are individually matched with the respective separate light sources. This means that the holographic information of the respective hologram segments corresponds with the separate light source assigned to the respective hologram segments. The segmentation of the hologram effected by the invention allows an optimization of the white light composition for a light distribution. By superimposing the light distributions generated by the hologram segments which are each matched with different light sources and correspondingly optimized, an optimized total light distribution can be generated. By a respective control of the, at least one, light source assigned to the hologram segments, the light distribution applied to in the respective hologram segment can be generated. As an alternative to selectively switching on and off the respective light sources, the light assigned to the hologram segment can also reach it by deflected light radiated by a light source via moving mirrors. The number of the hologram segments corresponds to the number of light distributions provided by the lighting device.

According to a preferred embodiment of the invention, the hologram segments each have a multitude of sub-hologram elements arranged in a matrix-like manner, onto each of which the holographic information has been applied by means of the light modulator. Therefore, a multitude of holographic information is available as the dimensions of the sub-hologram elements preferably lie in the μm-range. The application of this holographic information to the sub-hologram elements is preferably executed in a sequential manner.

According to a further development of the invention, the hologram segments are arranged in a defined angle, preferably transversely, to a main radiation direction of the light next to one another and, if needed, holograms or hologram segments in the main radiation direction one behind the other in addition. By this means, a multitude of light distributions can be generated in a space-saving manner.

According to a further development of the invention, the light sources assigned to the respective hologram segments radiate light having a white light color, wherein the information regarding different wavelengths and wavefront shapes are contained in the sub-hologram elements of the respective hologram segments.

According to a further development of the invention, several light sources can also be assigned to the hologram segments, which radiate light having a white light color or different light colors, for example red, green, and blue.

Reference is now made more particularly to the drawings, which illustrate the best presently known mode of carrying out the invention and wherein similar reference characters indicate the same parts throughout the views.

Figure 1:
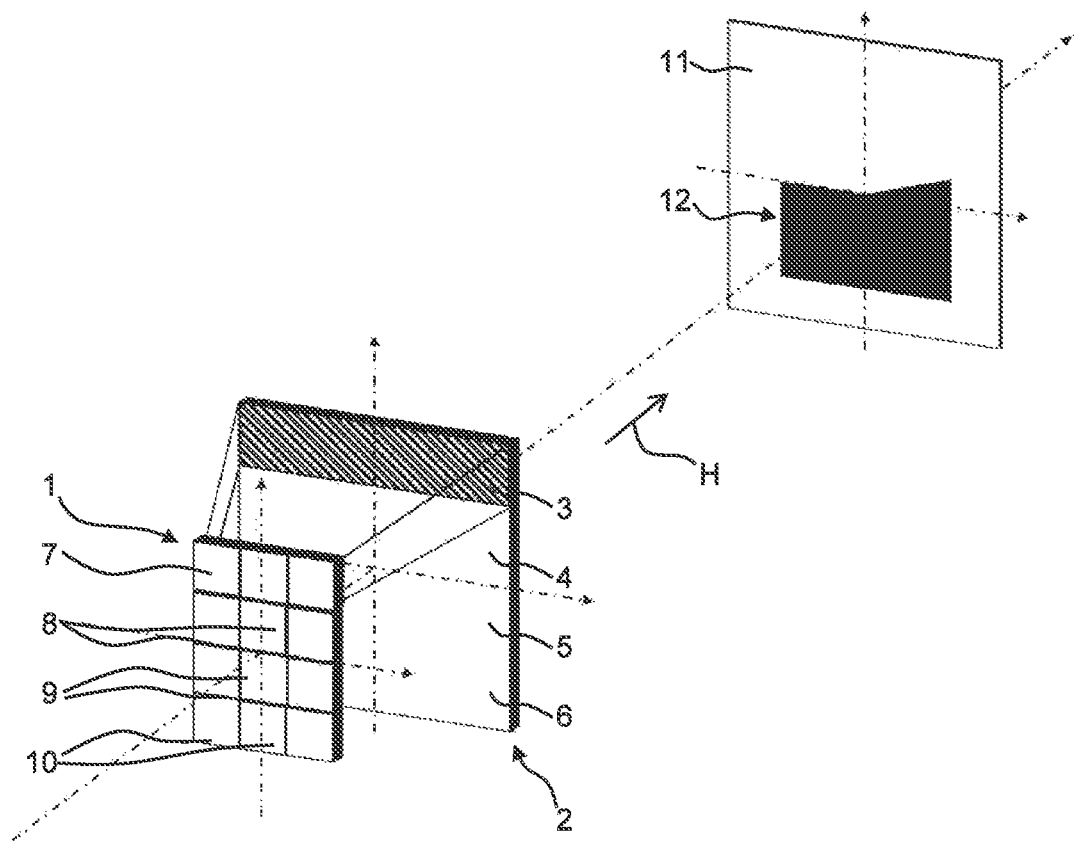
FIG. 1 is a schematic representation of a lighting device comprising a light source unit radiating white light, and a holographic unit, wherein first light sources are controlled for the lighting of a first hologram segment by means of which a first light distribution can be projected.
Figure 3:
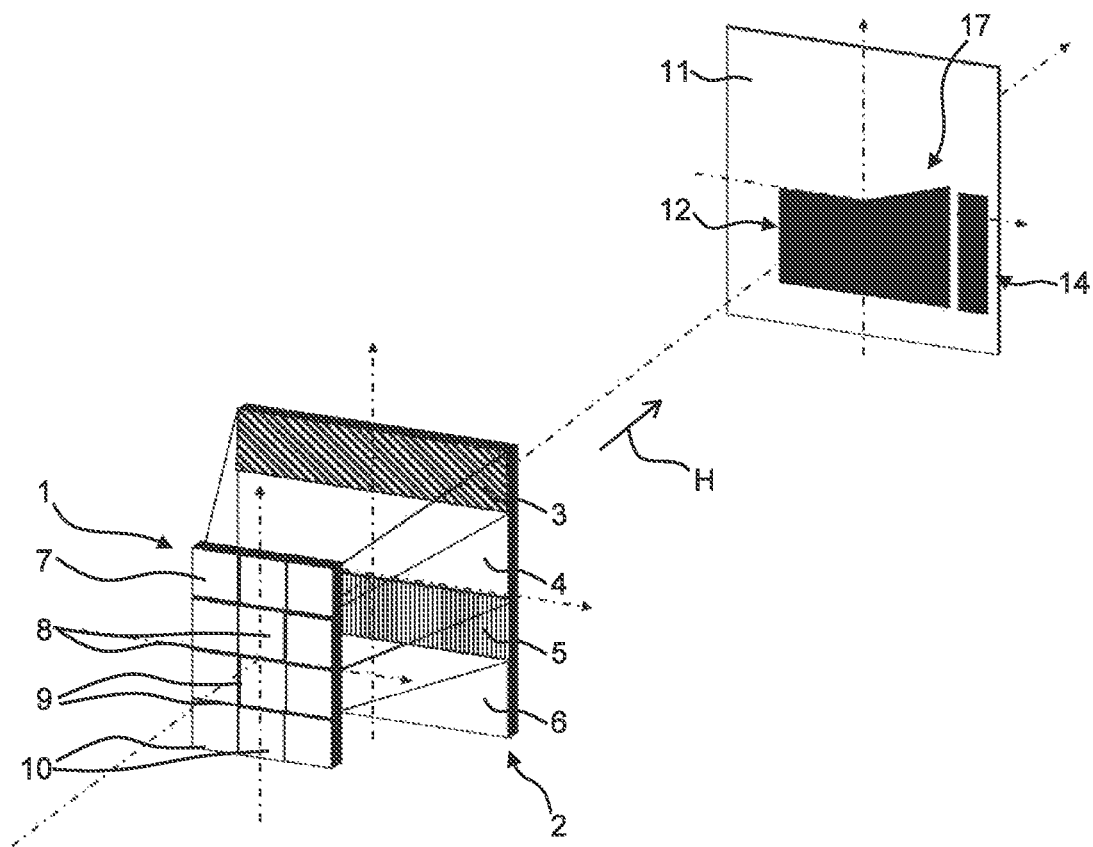
Figure 4:
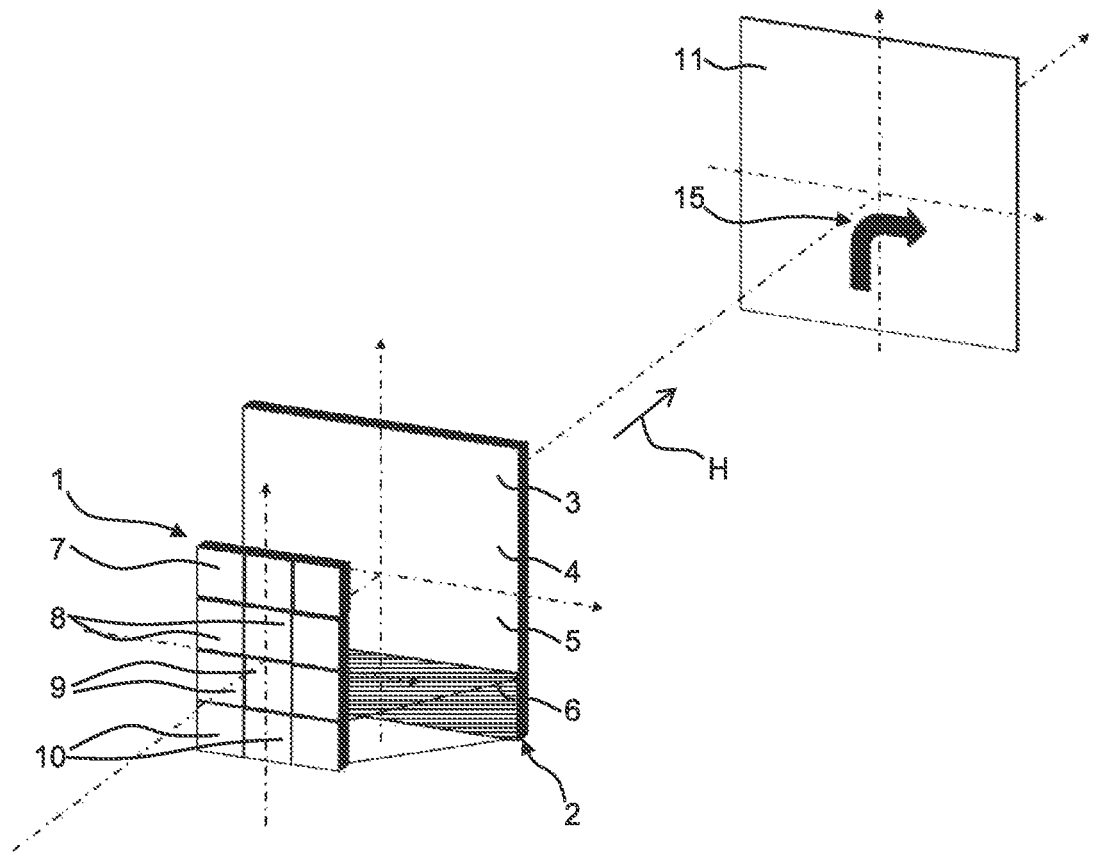
Figure 5:
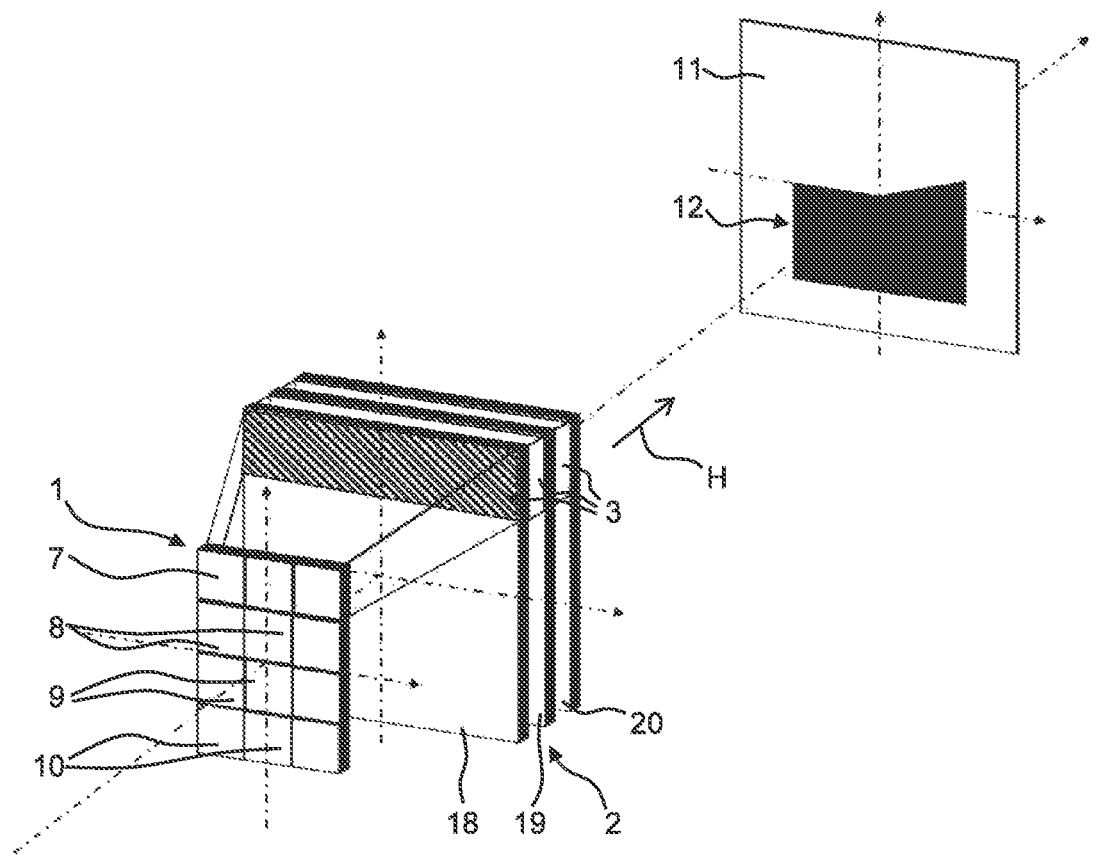
Figure 6:
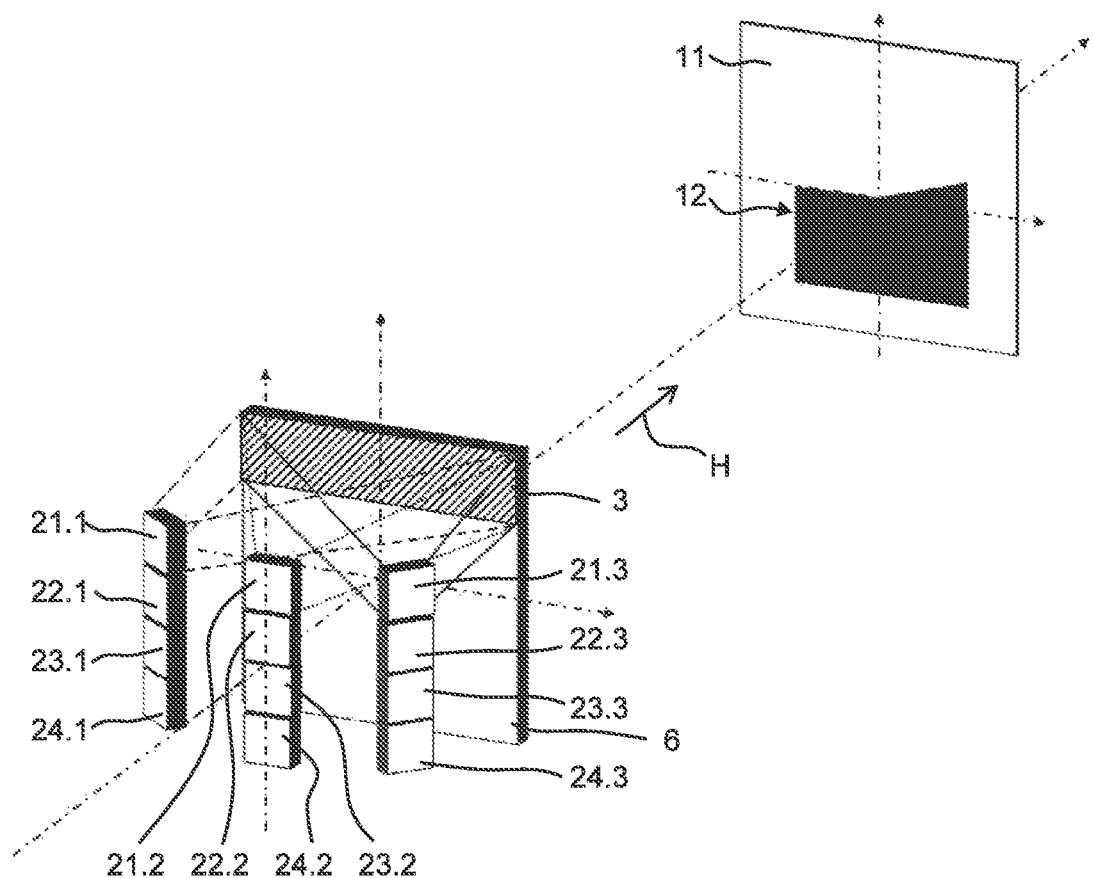

FIG. 3 illustrates the lighting device according to FIG. 1, wherein the first and a third light sources are controlled for the generation of a further total light distribution, FIG. 4 illustrates the representation of the lighting device according to FIG. 1, wherein fourth light sources are controlled for the lighting of a fourth hologram segment, by means of which a fourth light distribution can be generated, FIG. 5 illustrates a lighting device according to an alternative embodiment, in which holograms and/or hologram segments are arranged one behind the other in the light radiation direction, and FIG. 6 illustrates a lighting device in which the hologram and/or the hologram segments can be lighted by means of light sources with differing light colors.

DETAILED DESCRIPTION OF THE DRAWINGS

A lighting device for vehicles which can for example be employed as a headlamp, essentially comprising a light source unit 1 and a holographic unit 2 arranged at a distance in the main radiation direction H of the light source unit 1. Optionally, the lighting device can have an optical unit for the focusing or dispersion of the light.

According to a first embodiment of the lighting device according to the FIGS. 1 to 4, the holographic unit 2 has a hologram consisting of four hologram segments, namely a first hologram segment 3, a second hologram segment 4, a third hologram segment 5 and a fourth hologram segment 6. The hologram segments 3, 4, 5, 6 are arranged in an extension plane of the hologram 2 and run next to one another at right angles to the main radiation direction H of the light. The hologram segments 3, 4, 5, 6 are each embodied in a strip-like manner and extend in the horizontal direction. The first hologram segment 3 forms the top hologram segment, while the fourth hologram segment 6 forms the bottom hologram segment.

The light source unit 1 has a multitude of light sources radiating white light which are arranged matrix-like in one plane. The light source unit 1 has a multitude of first light sources 7, which are assigned to the first hologram segment 3. Furthermore, the light source unit 1 has second light sources 8 assigned to the second hologram segment 4 which are arranged at right angles to the main radiation direction H next to the first light sources 7. Third light sources 9 assigned to the third hologram segment 5 are arranged next to the second light sources 8. Fourth light sources 10 assigned to the fourth hologram segment 6 are arranged next to the third light sources 9

Figure 2:
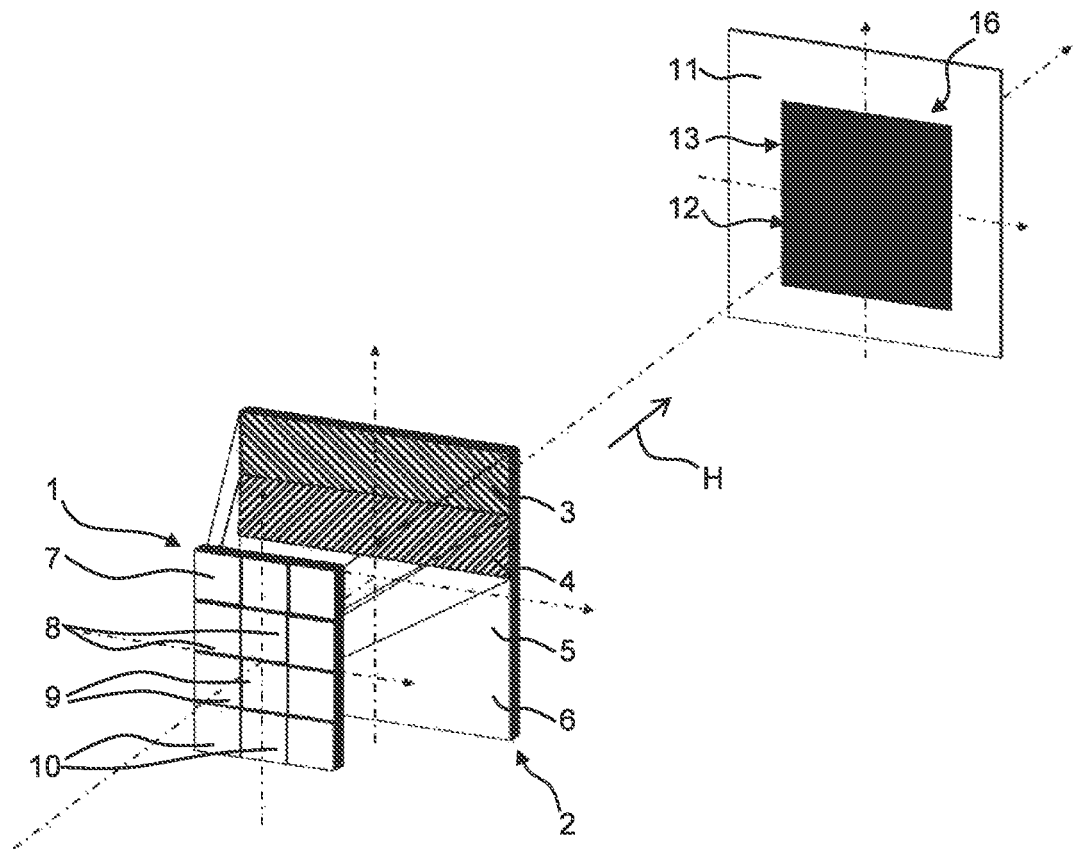
FIG. 2 illustrates the lighting device according to FIG. 1, wherein the first light sources are controlled together with second light sources for the lighting of the first hologram segment and a second hologram segment for the generation of a total light distribution consisting of two light distributions.

Holographic information is applied to each of the hologram segments 3, 4, 5, 6 by means of a light modulator which is not represented, so that given light distributions are generated in connection with the respectively assigned light sources 7, 8, 9, and 10. As can be seen in FIG. 1, only the first hologram segment 3 is illuminated when only the first light sources 7 are switched on resp. controlled, so that an asymmetric low beam light distribution is generated on a test screen 11 as a first light distribution 12. If in addition the second light sources 8 are switched on, as represented in FIG. 2, the second hologram segment 4 is illuminated, so that a total light distribution 16 representing a high beam light distribution is generated by superimposing the first light distribution 12 and a second light distribution 13.

If only the first light sources 7 and the third light sources 9 are controlled, as represented in FIG. 3, the first light distribution 12 and a third light distribution 14 embodied as bend lighting light distribution are generated, which form a second total light distribution 17 by superimposition.

If only the fourth light sources 10 are controlled, the illumination of the fourth hologram segment 6 is achieved, which serves the generation of a fourth light distribution 15, which is embodied as an informational light distribution; in the present embodiment it represents an arrow pointing to the right for navigation purposes.

For the light distributions 12, 13, 14, 15 to be generated, respective holographic information is applied to the hologram segments 3, 4, 5, 6 depending on different wavelengths and different angles of the light sources 7, 8, 9, 10 assigned to the respective hologram segments 3, 4, 5, 6. The holographic information is applied to sub-hologram segments of the respective hologram segments 3, 4, 5, 6, which extend matrix-like over the surface of the respective hologram segments 3, 4, 5, 6 and which have dimensions in the µm-range, for example 400 µm to 800 µm.

In the present embodiment, the hologram 2 is embodied as an even plate. The hologram 2 may also be uneven and/or arranged in an integrated manner in a cover lens of a headlamp housing.

The light sources 7, 8, 9, 10 are arranged matrix-like in a common plane of the light source unit 1. The light sources 7, 8, 9, 10 assigned to the hologram segments 3, 4, 5, 6 are arranged in a row-like manner, wherein the direction of the row corresponds with the extension direction of the respective hologram segments 3, 4, 5, 6.

The hologram segments 3, 4, 5, 6 are preferably embodied as plane hologram faces. As the hologram 2 is embodied as a volume transmission hologram, the hologram segments 3, 4, 5, 6 have predefined diffraction characteristics.

The light sources 7, 8, 9, 10 can be embodied as LED light sources or as laser light sources.

According to a second embodiment of the invention following to FIG. 5, several holograms 18, 19, 20 can also be arranged one behind the other in the main radiation direction H. These holograms 18, 19, 20 each have the hologram segments 3, 4, 5, 6, so that during the controlling of the first light sources 7 only the first hologram segment 3 of the first hologram 18 and of the second hologram 19 and the third hologram 20 are illuminated, so that a respective low beam light distribution 12 is generated. The hologram unit formed in this manner therefore consists of several layers of holograms 18, 19, 30, which are preferably connected to one another by gluing.

According to a further alternative embodiment following FIG. 6, first light sources 21.1, 21.2, 21.3, second light sources 22.1, 22.2, 22.3, third light sources 23.1, 23.2, 23.3 and fourth light sources 24.1, 24.2, 24.3 are provided, which—in contrast to the first embodiment of the invention—radiate light with a red light color 21.1, 22.1, 23.1, 24.1, and green light color 21.2, 22.2, 23.2, 24.2, and blue light color 21.3, 22.3, 23.3, 24.3 respectively. The light sources radiating red light 21.1, 22.1, 23.1, 24.1, and the light sources radiating green light 21.2, 22.2, 23.2, 24.2, and the light sources radiating blue light 21.3, 22.3, 23.3, 24.3 are arranged in an upright manner next to one another and under the same angle relative to the respective hologram segments 3, 4, 5, 6. The angle, or the orientation of the light sources radiating red light 21.1, 22.1, 23.1, 24.1 relative to the hologram segment 3, 4, 5, 6 is therefore different from the orientation of the light sources radiating green light 21.2, 22.2, 23.2, 24.2 and/or the light sources radiation blue light 21.3, 22.3, 23.3, 24.3.

LIST OF REFERENCE SIGNS

1 Light source unit
2 Holographic unit
3 1st hologram segment
4 2nd hologram segment
5 3rd hologrammsegment
6 4th hologrammsegment
7 1st light source
8 2nd light source
9 3rd light source
10 4th light source
11 Test screen
12 1st light distribution
13 2. light distribution
14 3. light distribution
15 4. light distribution
16 1st total light distribution
17 2nd total light distribution 18 1st hologram
19 2nd hologram
20 3rd hologram
21.1—1st light sources
21.3
22.1—2nd light sources
22.3
23.1—3rd light sources
23.3
24.1—4th light sources
24.3
H Main radiation direction

The invention claimed is:

1. A lighting device for vehicles comprising:
a light source unit;
a holographic unit for generating a given light distribution, wherein the holographic unit has a hologram on the basis of a photo-sensitive material, onto which the holographic information has been applied by means of an exposure procedure,
wherein the hologram is formed by a plurality of hologram segments,
wherein the hologram segments are each assigned a separate light source of the light source unit; and
wherein the hologram segments serve to generate the given light distribution,
wherein for each of the hologram segments, holographic information is applied depending on different wavelengths and different angles of the light source assigned to each respective of the hologram segments;
wherein the hologram segments are arranged next to one another at a defined angle relative to a main radiation direction (H) of the light, and
wherein two or more holograms are arranged one behind the other in the main radiation direction (H) of the light such that the light passes through a first hologram before it passes through a second hologram.

2. The lighting device according to claim 1, wherein the hologram segments each have a plurality of matrix-like hologram sub-elements, to each of which the holographic information is applied by means of the exposure procedure via a light modulator.

3. The lighting device according to claim 1 wherein the light sources assigned to the respective hologram segments are embodied as light sources radiating white light, which are arranged on a common plane at a defined angle relative to the main radiation direction (H).

4. The lighting device according to claim 1 wherein the light sources assigned to the respective hologram segments are embodied as light sources radiating different light wave lengths, which are arranged at the defined angle relative to the main radiation direction (H) and at a different angle to the hologram segments.

5. The lighting device according to claim 1 wherein the light sources are arranged in a matrix-like manner and that for the generation of the given light distribution, wherein the light sources assigned to it are controllable such that they can be turned on and off selectively.

6. The lighting device according to claim 1 wherein the hologram segments are each embodied as plane or curved hologram surfaces.

7. The lighting device according to claim 1 wherein a predefined light distribution is generated by means of the hologram segments.

8. The lighting device according to claim 1 wherein the hologram sub-elements of the hologram segments each have dimensions in a range between 400 and 800 µm.

9. The lighting device according to claim 1 wherein the hologram is embodied as a volume transmission hologram.

* * * * *